United States Patent
Merzougui et al.

(10) Patent No.: US 9,252,431 B2
(45) Date of Patent: Feb. 2, 2016

(54) FUEL CELL CATALYST WITH METAL OXIDE/PHOSPHATE SUPPORT STRUCTURE AND METHOD OF MANUFACTURING SAME

(75) Inventors: Belabbes Merzougui, Manchester, CT (US); Tetsuo Kawamura, South Glastonbury, CT (US)

(73) Assignees: Audi AG, Ingolstadt (DE); Toyota Jidosha Kabushiki Kaisha, Toyota-shi (JP)

( * ) Notice: Subject to any disclaimer, the term of this patent is extended or adjusted under 35 U.S.C. 154(b) by 1003 days.

(21) Appl. No.: 13/147,375
(22) PCT Filed: Feb. 10, 2009
(86) PCT No.: PCT/US2009/033609
§ 371 (c)(1),
(2), (4) Date: Aug. 2, 2011
(87) PCT Pub. No.: WO2010/093354
PCT Pub. Date: Aug. 19, 2010

(65) Prior Publication Data
US 2012/0021337 A1    Jan. 26, 2012

(51) Int. Cl.
*H01M 4/92* (2006.01)
*B01J 21/06* (2006.01)
(Continued)

(52) U.S. Cl.
CPC .............. *H01M 4/8803* (2013.01); *B01J 21/18* (2013.01); *B01J 23/89* (2013.01); *B01J 37/024* (2013.01); *H01M 4/9008* (2013.01); *H01M 4/92* (2013.01); *Y02E 60/50* (2013.01)

(58) Field of Classification Search
CPC ... H01M 4/8803; H01M 4/9008; H01M 4/92; B01J 21/06; B01J 23/89; B01J 37/024
USPC ................. 429/524, 528, 532, 535, 525, 527; 427/115
See application file for complete search history.

(56) References Cited

U.S. PATENT DOCUMENTS

| 4,643,957 A | 2/1987 | Takeuchi et al. |
| 5,112,706 A | 5/1992 | Pinsky et al. |

(Continued)

FOREIGN PATENT DOCUMENTS

| EP | 0 248 386 A2 | 12/1987 |
| EP | 1883131 A1 | 1/2008 |

(Continued)

OTHER PUBLICATIONS

International Search Report and Written Opinion of the International Searching Authority for International application No. PCT/US2009/033609 mailed Sep. 29, 2009.

(Continued)

*Primary Examiner* — Ula C Ruddock
*Assistant Examiner* — Thomas Parsons
(74) *Attorney, Agent, or Firm* — Seed IP Law Group PLLC

(57) ABSTRACT

A fuel cell supported catalyst includes an underlying support structure having at least one of a metal oxide and a metal phosphate. Catalyst particles are arranged onto and in engagement with the support structure. An intermediate conductive, corrosion-resistant layer, such as boron-doped-diamond, is arranged onto and in engagement with the support structure to surround the catalyst particles. The supported catalyst is produced by depositing the intermediate layer onto the support structure after the catalyst particles have been deposited on the underlying support structure, in one example. In another example, voids are provided in the intermediate layer, which has been deposited onto the underlying support structure, to subsequently receive the catalyst particles.

14 Claims, 2 Drawing Sheets

(51) Int. Cl.
   *B01J 23/89*   (2006.01)
   *H01M 4/88*   (2006.01)
   *B01J 21/18*   (2006.01)
   *B01J 37/02*   (2006.01)
   *H01M 4/90*   (2006.01)

(56) References Cited

U.S. PATENT DOCUMENTS

| | | |
|---|---|---|
| 5,677,074 A | 10/1997 | Serpico et al. |
| 5,783,325 A | 7/1998 | Cabasso et al. |
| 6,811,911 B1 | 11/2004 | Peled et al. |
| 6,828,056 B2 | 12/2004 | Molter et al. |
| 6,884,290 B2 | 4/2005 | Swain et al. |
| 7,108,773 B2 | 9/2006 | Masel et al. |
| 7,129,194 B2 | 10/2006 | Baca et al. |
| 2001/0000889 A1 | 5/2001 | Yadav et al. |
| 2003/0166734 A1 | 9/2003 | Krylova et al. |
| 2003/0166987 A1 | 9/2003 | Roark |
| 2004/0221796 A1 | 11/2004 | Swain et al. |
| 2005/0112451 A1 | 5/2005 | Lee et al. |
| 2006/0134507 A1 | 6/2006 | Park et al. |
| 2006/0175953 A1 | 8/2006 | Swain et al. |
| 2006/0188775 A1 | 8/2006 | Mance et al. |
| 2006/0257719 A1 | 11/2006 | Merzougui et al. |
| 2007/0248862 A1 | 10/2007 | Park et al. |
| 2007/0281204 A1 | 12/2007 | Uensal et al. |
| 2008/0014494 A1 | 1/2008 | Iordache et al. |
| 2008/0166623 A1 | 7/2008 | Cendak et al. |
| 2008/0194400 A1 | 8/2008 | Schmidt |

FOREIGN PATENT DOCUMENTS

| | | | |
|---|---|---|---|
| JP | 2000048833 A | | 2/2000 |
| JP | 2002200427 A | | 7/2002 |
| JP | 2002246033 A | | 8/2002 |
| KR | 10-2006-0071555 A | | 6/2006 |
| WO | WO2010033111 | * | 3/2010 |
| WO | WO2010033121 | * | 3/2010 |

OTHER PUBLICATIONS

International Preliminary Report on Patentability for International application No. PCT/US2009/033609 mailed Aug. 25, 2011.
International Application No. WO 2008/006210, Machine Translation, 6 pages.
International Preliminary Report on Patentability, issued Mar. 22, 2011, for International Application No. PCT/US2008/076577 4 pages.
International Preliminary Report on Patentability, issued Mar. 22, 2011, for International Application No. PCT/US2008/076948, 4 pages.
International Search Report and Written Opinion, mailed Mar. 31, 2009, for International Application No. PCT/US2008/076948, 10 pages.
International Search Report, mailed Mar. 31, 2009, for International Application No. PCT/US2008/076577, 2 pages.
Young, "Miniature Fuel Cell Harnesses the Power of Bee Venom," Apitherapy News, 2007, 1 page.
U.S. Appl. No. 13/057,198, filed Feb. 2, 2011, Fuel Cell Catalyst Support With Fluoride-Doped Metal Oxides/Phosphates and Method of Manufacturing Same.
U.S. Appl. No. 13/057,308, filed Feb. 3, 2011, Fuel Cell Catalyst Support With Boron Carbide-Coated Metal Oxides/Phosphates and Method of Manufacturing the Same.

* cited by examiner

US 9,252,431 B2

FUEL CELL CATALYST WITH METAL OXIDE/PHOSPHATE SUPPORT STRUCTURE AND METHOD OF MANUFACTURING SAME

TECHNICAL FIELD

This disclosure relates to fuel cell supported catalyst and methods of manufacturing the same.

BACKGROUND

Cost and durability issues have made it difficult to commercialize fuel cells. Fuel cells utilize a catalyst that creates a chemical reaction between a fuel, such as hydrogen, and an oxidant, such as oxygen, typically from air. The catalyst is typically platinum loaded onto a support, which is usually a high surface area carbon.

Some durability issues are attributable to the degradation of the support caused by corrosion. Electrochemical studies have indicated that the corrosion depends strongly on surface area and morphology structure of carbon. For example, it has been reported that carbon with high surface area, such as ketjen black, can corrode severely at potentials experienced during start and stop cycling of the fuel cell causing a dramatic loss in fuel cell performance. Accordingly, to overcome this particular durability issue, it may be desirable to use a support other than carbon that is more chemically and electrochemically stable.

One possible alternative support for a catalyst is a metal oxide or metal phosphate. Metal oxides/phosphates can typically have a high surface area and good corrosion resistance in low temperature fuel cell applications. However, most of those high surface area metal oxides/phosphates are not conductive, and are extremely hydrophilic. Hydrophilic supports can cause sever problems, such as flooding, which leads to significant drop in cell performance, especially at high current densities. As a result, metal oxide/phosphate based supported catalysts have not been applied to low temperature fuel cells.

What is therefore needed is a modified metal oxide/phosphate based supported catalyst that is suitable for use in a fuel cell environment.

SUMMARY

A fuel cell supported catalyst is disclosed that includes an underlying support structure having at least one of a metal oxide and a metal phosphate. Catalyst particles are arranged onto and in engagement with the support structure. An intermediate conductive, corrosion-resistant layer, such as boron-doped-diamond, is arranged onto and in engagement with the support structure to surround the catalyst particles. The supported catalyst is produced by depositing the intermediate layer onto the underlying support structure after the catalyst particles have been deposited on the underlying support structure, in one example. In another example, voids are provided in the intermediate layer, which has been deposited onto the underlying support structure, to subsequently receive the catalyst particles.

These and other features of the disclosure can be best understood from the following specification and drawings, the following of which is a brief description.

DETAILED DESCRIPTION

Figure 1:
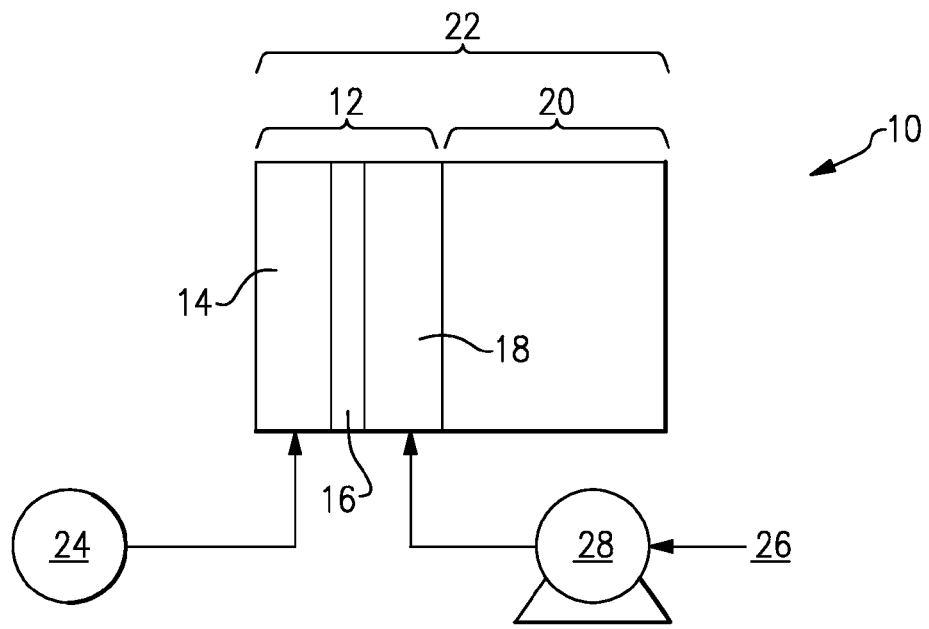
FIG. 1 is a highly schematic view of an example fuel cell.

An example fuel cell 10 is schematically illustrated in FIG. 1. The fuel cell 10 includes a cell 12 having an anode 14 and a cathode 18 arranged about a proton exchange membrane 16. The anode 12 receives a fuel, such as hydrogen, from a fuel source 24. A pump 28 supplies an oxidant, such as air, from an oxidant source 26 to the cathode 18. In the example, the oxidant source 26 is a surrounding environment. The fuel and oxidant react in a controlled chemical process to produce electricity. The cell 12 and other cells 20 are arranged in a cell stack assembly 22, to provide enough electricity to power a load. The fuel cell 10 shown in FIG. 1 is exemplary only and should not be interpreted as limiting the claims.

The anode 14 and cathode 18 typically include a catalyst arranged on a catalyst support. The catalyst support provides the underlying high surface area structure upon which a controlled amount of catalyst particles are deposited. Typically, the catalyst is platinum particles and the catalyst support is carbon, such as ketjen black, carbon fibers or graphite.

Figure 2:
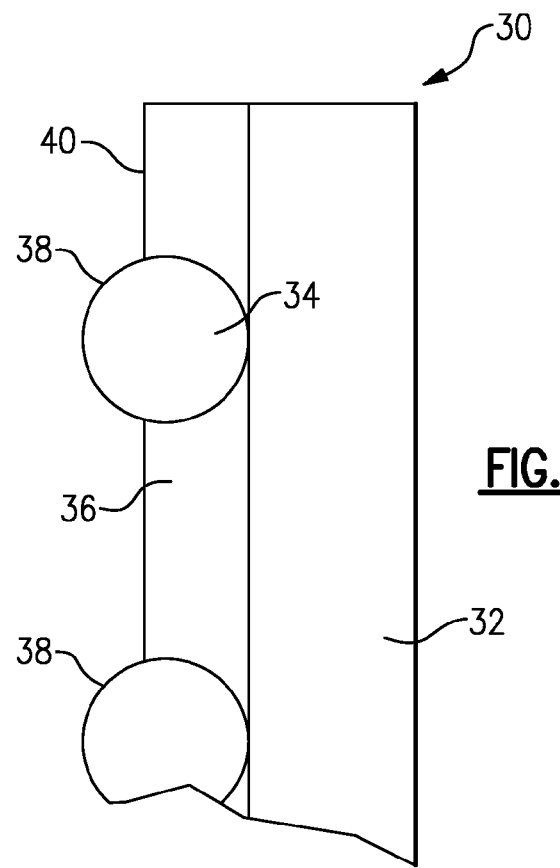
FIG. 2 is a highly schematic view of an example metal oxide/phosphate based supported catalyst for the fuel cell shown in FIG. 1.

This disclosure relates to a supported catalyst 30 having a metal oxide or metal phosphate underlying support structure 32, as shown in FIG. 2. The underlying support structure 32 may also be a mixture of metal oxides and metal phosphates. Example metal oxides include oxides of titanium (e.g., $TiO_2$ or $Ti_4O_7$), oxides of zirconium ($ZrO_2$), oxides of tungsten ($WO_3$), oxides of tantalum ($Ta_2O_5$), and oxides of niobium ($NbO_2$, $Nb_2O_5$). Other example metal oxides include oxides of yttrium, molybdenum, indium and/or tin (e.g., ITO). Metal phosphates include, for example, TaPOx, TiPOx, and FePOx. Metal oxides/phosphates with a high surface area are more desirable so that the catalyst particles can be correspondingly well dispersed and exhibit enhanced catalytic activity. Metal oxides/phosphates are highly corrosion resistant in a low temperature fuel cell environment which makes them a viable support material.

However, metal oxides/phosphates are extremely hydrophilic, which is undesirable property in some applications due to electrode flooding, particularly in the low temperature fuel cells. In addition, undoped metal oxides/phosphates have limited electrically conductivity but catalyst supports typically must be somewhat conductive to ensure effective electron transfer within the supported catalyst structure. Otherwise the fuel cell will experience an undesirable amount of internal resistance. As a result, the supported catalyst must not only be more hydrophobic but also conductive to be suitable for use as in fuel cell. To this end, a conductive intermediate layer is deposited onto the metal oxides/phosphate underlying support structure. In one example, a boron-doped-diamond (BDD) is used as the intermediate layer. However, BDD is expensive, has limited strong-metal-support-interaction and has a low surface area. Accordingly, it is desirable to use BDD in a controlled, limited manner and deposit the catalyst particles directly onto the metal oxide/ phosphate support structure. Other conductive corrosion-resistant intermediate layer materials include graphitized carbon, diamond-like carbon, carbides and conductive polymers may be substituted for the BDD.

The supported catalyst 30 includes catalyst particles 34 arranged on the metal oxide/phosphate underlying support structure 32. Example catalysts include noble metals, such as platinum, palladium, gold, ruthenium, rhodium, iridium, osmium, or alloys thereof. A secondary metal can also be used to reduce the amount of noble metal used. Example secondary metals include transition metals, such as cobalt, nickel, iron, copper, manganese, vanadium, titanium, zirconium and chromium. The catalyst particles 34 are in contact with and physically supported by the metal oxide/phosphate underlying support structure 32. An intermediate layer 36 coats the metal oxide/phosphate underlying support structure 32 such that a surface 38 of the catalyst particles 34 are exposed and extend beyond the surface 40 of the intermediate layer 36. The supported catalyst 30 described above has excellent oxygen reduction reaction activity and durability.

Figure 3A:
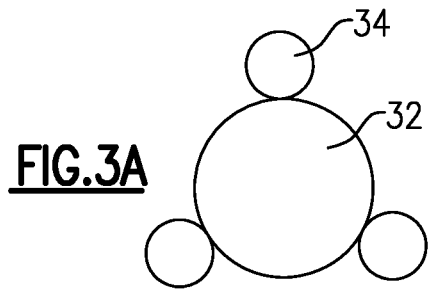
FIGS. 3a-3b illustrate a method of producing a fuel cell supported catalyst by coating a metal oxide/phosphate underlying support with a catalytic material and an intermediate layer.
Figure 3B:
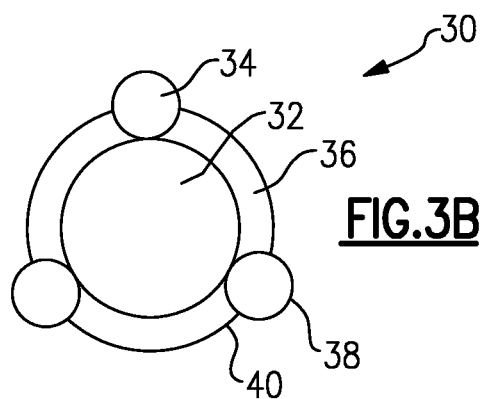

Several example methods of producing the supported catalyst 30 are schematically depicted in FIGS. 3a-5d. A first method of producing is shown in FIGS. 3a-3b. Referring to FIG. 3a, the catalyst particles 34 are deposited onto the metal oxide/phosphate underlying support structure 32. An intermediate layer 36 is deposited onto the metal oxide/phosphate underlying support structure 32 around or surrounding the catalyst particles 34, as shown in FIG. 3b. In the example, the intermediate layer 36 is in engagement with the catalyst particles 34 and a significant amount of the metal oxide/phosphate underlying support structure 32 is not exposed. The thickness of the intermediate layer 36 is selected to be thick enough to provide desired conductivity and thin enough to permit the surfaces 38 to extend beyond the surface 40. In this manner, a reduced amount of BDD can be used in producing the supported catalyst 30 when BDD is used as the intermediate layer material.

Figure 4A:
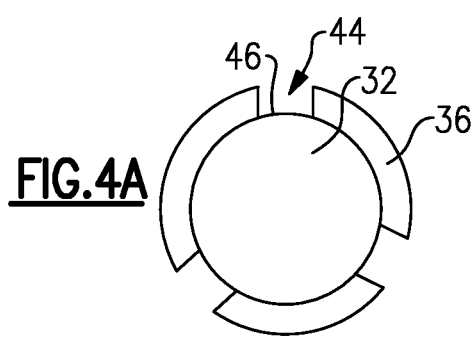
FIGS. 4a-4b illustrate another method of producing a fuel cell supported catalyst by coating a metal oxide/phosphate underlying support with a catalytic material and an intermediate layer.
Figure 4B:
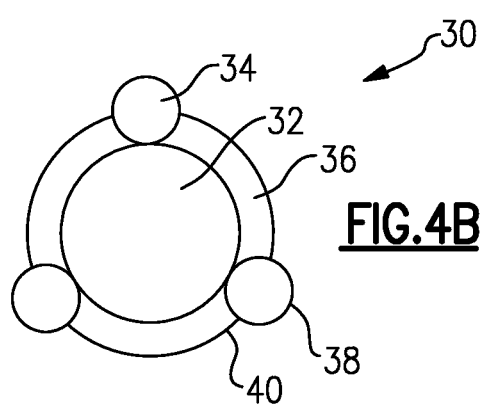

A second production method is shown in FIGS. 4a-4b. An incomplete intermediate layer 36 is deposited onto the metal oxide/phosphate underlying support structure 32 leaving voids 44 that expose a surface 46, as shown in FIG. 4a. The catalyst particles 34 are deposited into the voids 44 so that the catalyst particles 34 are in engagement with the metal oxide/phosphate underlying support structure 32, illustrated in FIG. 4b.

Figure 5A:
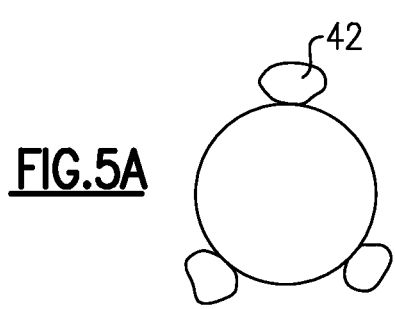
FIGS. 5a-5d illustrate yet another method of producing a fuel cell supported catalyst by coating a metal oxide/phosphate underlying support with a catalytic material and an intermediate layer.
Figure 5B:
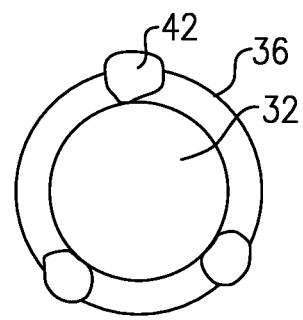
Figure 5C:
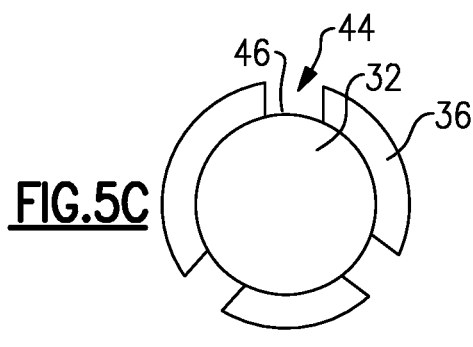
Figure 5D:
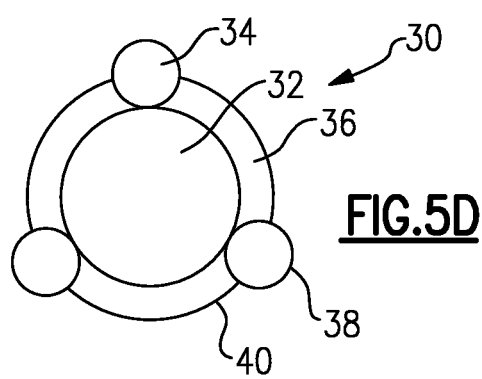

A third production method is shown in FIGS. 5a-5d. Referring to FIG. 5a, an intermediate material 42, such as a metal or other compound, is deposited onto the metal oxide/phosphate underlying support structure 32. The compound is chemically dissolvable. The intermediate layer 36 is deposited onto the metal oxide/phosphate support structure 32 so that the intermediate material 42 is exposed, as shown in FIG. 5b. Referring to FIG. 5c, the intermediate material 42 is dissolved in a chemical, such as an acid solution, which leaves voids 44 that expose the surface 46 of the metal oxide/phosphate support structure 32. Finally, the catalyst particles 34 are deposited within the voids 44 and onto the metal oxide/phosphate underlying support structure 32, as shown in FIG. 5d.

Although example embodiments have been disclosed, a worker of ordinary skill in this art would recognize that certain modifications would come within the scope of the claims. For that reason, the following claims should be studied to determine their true scope and content.

The invention claimed is:

1. A fuel cell catalyst, comprising:
   a support structure including at least one of a metal oxide and a metal phosphate;
   catalyst particles, each of the catalyst particles directly on the support structure and physically supported by the support structure; and
   a conductive, corrosion-resistant intermediate layer on the support structure and surrounding sides of the catalyst particles, a first portion of a surface of the catalyst particles remaining uncovered by the intermediate layer.

2. The fuel cell catalyst according to claim 1, wherein the support structure includes oxides of at least one of titanium, zirconium, tungsten, tantalum, niobium, yttrium, molybdenum, indium and tin and their corresponding phosphates.

3. The fuel cell catalyst according to claim 1, wherein the catalyst particles include at least one noble metal.

4. The fuel cell catalyst according to claim 3, wherein the noble metal includes at least one of platinum, palladium, gold, ruthenium, rhodium, iridium, osmium, or alloys thereof.

5. The fuel cell catalyst according to claim 3, wherein the catalyst particles include at least one transition metal.

6. The fuel cell catalyst according to claim 5, wherein the transition metal includes at least one of cobalt, nickel, iron, copper, manganese, vanadium, titanium, zirconium and chromium.

7. The fuel cell catalyst according to claim 1, wherein the conductive, corrosion-resistant intermediate layer includes at least one of boron-doped-diamond, graphitized carbon, diamond-like carbon, carbides, conductive polymers, and mixture of two or more thereof.

8. A method, comprising:
   producing a fuel cell catalyst, the producing including:
      providing a support structure including at least one of a metal oxide and a metal phosphate;
      depositing dissolvable particles onto the support structure, the dissolvable particles being physically supported directly by the support structure;
      after depositing the dissolvable particles, depositing a conductive, corrosion-resistant intermediate layer on the support structure and surrounding sides of the dissolvable particles, a first portion of the dissolvable particles remaining uncovered by the intermediate layer;
      after depositing the intermediate layer, dissolving the dissolvable particles, leaving voids in the intermediate layer and exposing a surface of the support structure; and
      after dissolving the dissolvable particles, depositing catalyst particles within the voids and directly onto the support structure.

9. The method according to claim 8, wherein the conductive, corrosion-resistant intermediate layer includes at least one of boron-doped-diamond, graphitized carbon, diamond-like carbon, carbides and conductive polymers.

10. The method according to claim 8, wherein the support structure includes oxides of at least one of titanium, zirconium, tungsten, tantalum, niobium, yttrium, molybdenum, indium, tin and their corresponding phosphates.

11. The method according to claim 8, wherein the catalyst particles include at least one noble metal.

12. The method according to claim 11, wherein the noble metal includes at least one of platinum, palladium, gold, ruthenium, rhodium, iridium, osmium, or alloys thereof.

13. The method according to claim 11, wherein the catalyst particles include at least one transition metal.

14. The method according to claim 13, wherein the transition metal includes at least one of cobalt, nickel, iron, copper, manganese, vanadium, titanium, zirconium and chromium.

* * * * *